United States Patent [19]

Schmitt

[11] Patent Number: 4,469,958
[45] Date of Patent: Sep. 4, 1984

[54] ELECTRICAL CIRCUIT FOR ABSOLUTE POSITION MEASURING DEVICE

[75] Inventor: Walter Schmitt, Traunreut, Fed. Rep. of Germany

[73] Assignee: Dr. Johannes Heidenhain GmbH, Traunreut, Fed. Rep. of Germany

[21] Appl. No.: 328,363

[22] Filed: Dec. 7, 1981

[30] Foreign Application Priority Data

Dec. 27, 1980 [DE] Fed. Rep. of Germany ....... 3049262

[51] Int. Cl.$^3$ .......................... G06G 7/12; H03K 17/56
[52] U.S. Cl. ..................................... 307/246; 307/311; 307/590
[58] Field of Search ....................... 307/246, 311, 590; 250/552; 340/762, 782, 811

[56] References Cited

U.S. PATENT DOCUMENTS

| | | | |
|---|---|---|---|
| 3,986,144 | 10/1976 | Russo | 250/552 |
| 4,031,417 | 6/1977 | Wesner | 307/311 |
| 4,075,512 | 2/1978 | Rast, Jr. et al. | 307/311 |
| 4,190,836 | 2/1980 | Kumura et al. | 307/246 |
| 4,291,412 | 9/1981 | Imazeki | 340/811 |

FOREIGN PATENT DOCUMENTS 1762444  5/1970  Fed. Rep. of Germany .
2340978  2/1975  Fed. Rep. of Germany .

Primary Examiner—Stanley D. Miller
Assistant Examiner—B. P. Davis
Attorney, Agent, or Firm—Willian, Brinks, Olds, Hofer, Gilson & Lione, Ltd.

[57] ABSTRACT

An improved apparatus for powering electrical components in an absolute position measuring device of the type including a coded scale and a scanning unit for reading the coded scale, wherein the scanning unit contains a code generator having a plurality of electrical components such as light-emitting diodes. The disclosed apparatus includes a capacitor connected in parallel with the components and a switching element, such as a transistor, connected in series with the components and in parallel with the capacitor. The switching element is responsive to a switching pulse of defined duration and voltage and it selectively applies a supply voltage to and interrupts the supply voltage from the electrical components.

13 Claims, 1 Drawing Figure

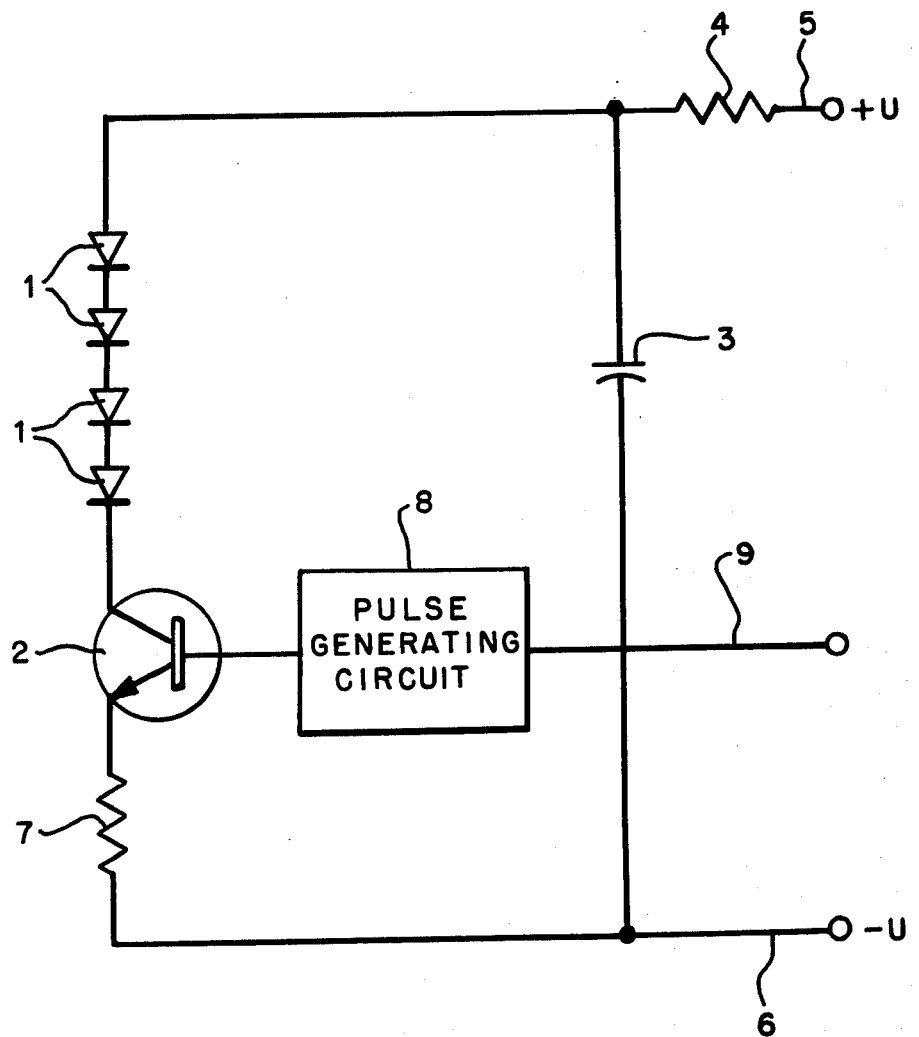

ELECTRICAL CIRCUIT FOR ABSOLUTE POSITION MEASURING DEVICE

BACKGROUND OF THE INVENTION

This invention relates to an improved arrangement for powering electrical components in absolute length- or angle-measuring devices of the type which include a coded scale; a scanning unit for reading the coded scale, which scanning unit contains a code generator which includes a plurality of electrical components; means for generating a brief duration switching signal; and means for generating a supply voltage between a pair of voltage supply terminals.

In the position measuring devices of the general type described above, it is standard practice in order to save current to switch on the electrical components of the code generator only briefly during the interrogation of absolute position values. It is known practice to have this switching on and off of the supply voltage controlled by a computer. Furthermore, if the electrical components in the code generator, such as light-emitting diodes, for example, are connected over long lines to a current supply apparatus, then it is standard practice to connect a capacitor in parallel to these components. This practice is especially helpful in the case of high switching frequencies. The diodes which illuminate a coded scale have a relatively high current requirement in the brief switching on of the code generator, and the current source and supply lines must be laid out correspondingly.

SUMMARY OF THE INVENTION

The present invention is directed to an arrangement for reducing the load on the current source and supply lines by using an improved switching arrangement for electrical components of the above-mentioned category in an absolute position measuring device of the type described above.

According to this invention, an absolute position measuring device of the type described above is provided with means for connecting the electrical components across the voltage supply terminals; a capacitor connected across the voltage supply terminals in parallel to the electrical components; and a resistor, included in the connecting means, connected in series with the parallel circuit of the capacitor and the electrical components.

Two important advantages of the invention are that first, a smaller voltage supply can be used and supply lines can be made of lighter gauge materials. This can result in a substantial reduction in manufacturing costs. Second, the use of the parallel capacitor decreases the alternating current constituent of the direct-current supply.

The invention itself, and its further objects and advantages, can best be understood by reference to the following detailed description taken in conjunction with the accompanying drawing.

BRIEF DESCRIPTION OF THE DRAWING

The drawing is a schematic diagram of the presently preferred embodiment of this invention.

DETAILED DESCRIPTION OF THE PRESENTLY PREFERRED EMBODIMENT

Referring now to the drawing, it shows a schematic diagram of the preferred embodiment of the circuit of this invention. This embodiment is designed for use in an absolute position measuring device of the type having a coded scale, a scanning unit to read the coded scale, means for generating a brief duration switching signal, and means for generating a supply voltage between a pair of supply terminals, wherein the scanning unit contains electrical components that are powered by the supply voltage. Throughout the specification and the following claims the term "absolute position measuring device" will be used to include both absolute length- and absolute angle-measuring devices.

As shown in the drawing, the preferred embodiment includes a series circuit of a switching transistor 2 which is connected between a resistor 7 and a series of light-emitting diodes 1. A capacitor 3 is connected in parallel with this series circuit, and the parallel circuit of the diodes 1, the transistor 2, and the resistor 7, and the capacitor 3 is in turn connected via a conductor 6 to the negative terminal of the voltage supply (not shown). The parallel circuit is also connected to resistor 4, which in turn a connected via a conductor 5 to the positive terminal of the voltage supply. In use, a positive voltage $+U$ would be applied to conductor 5 and a negative voltage $-U$ would be applied to conductor 6.

The collector of the switching transistor 2 is connected to the cathode of the diodes 1 and the emitter of the transistor 2 is connected to resistor 7. The case of the switching transistor 2 is driven via a conductor 9 by a computer (not shown), included in the position measuring device. The computer (not shown) generates a switching signal which is applied to conductor 9 and via the pulse generating circuit 8 to the base of the transistor 2 in order to selectively turn transistor 2 on or off.

The pulse generating circuit 8, which can for example include a mono-stable multivibrator, generates an output pulse of a predetermined duration, independently of the length of the switching signal delivered by the computer. The pulse generating circuit 8 drives the base of the switching transistor 2 in a manner such that overloading of the light-emitting diodes 1 is not possible. Furthermore, the output voltage of pulse generating circuit 8 serves to define the base voltage of the transistor 2. From this base voltage and the resistor 7 the current through the diodes 1 and the transistor 2 is established at a predetermined level such that the diodes 1 are driven by a constant current.

Table 1 below lists typical values for the capacitor and resistors in the arrangement described above. Table 2 describes typical components that can be used in this circuit. These tables are meant only to be descriptive of a typical arrangement and not to limit the invention to these particular values or specifications.

TABLE 1

| Component | Value | |
|---|---|---|
| Resistor 4 | R = 390 | Ohm |
| Resistor 7 | R = 39 | Ohm |
| Capacitor 3 | C = 100 | Micro-Farad |

TABLE 2

| Component | Specification |
|---|---|
| Diodes 1 | LD261 (Siemens) |
| Transistor 2 | BCX58 (Siemens) |
| Pulse Generating Circuit 8 | SN74121 (Texas Instruments) |

The circuit of this invention transforms brief, high current pulses to the diodes 1 into long-duration, low amplitude current pulses. The large time constant of the RC circuit comprising the capacitor 3 and the resistor 4 make the current changes at conductors 5,6 very small. Therefore the supply voltage (not shown) and conductors 5,6 only need supply slightly more than the time averaged value of the current which passes through the diodes 1.

More specifically, the circuit arrangement shown in the drawing operates as follows. The current pulse through the diodes 1 during the period when the switching transistor 2 is switched on leads to a voltage change on the capacitor 3 as defined by the following equation:

$$\Delta Uc = \frac{I \cdot \Delta t}{C}, \quad \text{(Eq. 1)}$$

where
 ΔUc = change of voltage on capacitor 3
 I = current through the electrical components such as the diodes 1
 Δt = duration of current pulse
 C = capacitance of capacitor 3

This voltage change (ΔUc) yields a current change through the resistor 4 as defined by the following equation:

$$\Delta I = \frac{\Delta Uc}{R}, \quad \text{(Eq. 2)}$$

where
 ΔI = change in current through resistor 4
 ΔUc = change in voltage on capacitor 3
 R = resistance of resistor 4

With these relations, an example of the load reduction possible with the RC circuit can be demonstrated. A brief (for example, 100 microsecond), high amperage (for example, 100 milliamp) current pulse through the diodes 1 during the time when the switching transistor 2 is switched on yields a change on the voltage of the capacitor 3 (with a capacitance for example of 100 microfarad) of 100 millivolts. This change of voltage on the capacitor 3 yields a current through the resistor 4 (with a resistance for example of 390 Ohm) of 0.25 milliamps. In this example the change in current supplied by the voltage supply (not shown) is only 0.25% of the peak current through the diodes 1. A substantial reduction in cost can thus be obtained by use of a smaller voltage supply and conductors made of lighter gauge materials.

The series circuit of the switching transistor 2 and diodes 1 placed in parallel with the capacitor 3 provides the additional advantage that it makes possible rapid switching of the voltage supply and a lag-free switching on and off of the diodes 1. In addition, the resistance 4 also serves as a current limitation in case the drive on the switching transistor 2 proves to be defective.

Of course, it should be understood that various changes and modifications to the preferred embodiment described herein will be apparent to those skilled in the art. For example other electrical components can be substituted for the light-emitting diodes 1 and other types of switching elements can be substituted for the switching transistor 2. It is therefore intended that the foregoing detailed description be regarded merely as illustrative of the presently preferred embodiment. It is intended that the following claims, including all equivalents, define the scope of the invention.

I claim:

1. In an absolute measuring device comprising a coded scale; a scanning unit for reading the coded scale, said scanning unit comprising a code generator which includes a plurality of electrical components; means for generating a brief duration switching signal; and means for generating a supply voltage between a pair of voltage supply terminals, the improvement comprising:
 means for connecting the electrical components of the scanning unit across the voltage supply terminals, said connecting means comprising a switch which is controlled by the switching signal and is connected in series with the electrical components;
 at least one capacitor connected across the voltage supply terminals in parallel with the electrical components to continuously maintain a charge on the capacitor; and
 a resistor included in the connecting means in series with the parallel circuit of the capacitor and the electrical components, to form with the capacitor an RC circuit with an RC time constant substantially greater than the duration of the switching signal;
 said improvement effective to reduce the peak current supplied by the means for generating the supply voltage to a value substantially less than the peak current through the electrical components.

2. The invention of claim 1 wherein a switching element is included in the connecting means in series with the electrical components and in parallel with the capacitor.

3. The invention of claim 1 or 2, wherein the electrical components comprise light-emitting diodes.

4. The invention of claim 2 wherein the switching element comprises a switchable constant current source.

5. The invention of claim 2 wherein the switching element comprises a transistor.

6. The invention of claim 5 wherein the base terminal of the transistor is connected to the means for generating a brief duration switching signal.

7. The invention of claim 5 wherein the base terminal of the transistor is connected to a pulse generating circuit which is connected to the means for generating a brief duration switching signal.

8. The invention of claim 1 wherein the capacitor is continuously charged by the means for generating the supply voltage for a time period substantially greater than the duration of the switching signal.

9. In an absolute measuring device comprising a coded scale; a scanning unit for reading the coded scale, said scanning unit comprising a code generator which includes a plurality of light sources; means for generating a brief duration switching signal; and means for continuously generating a supply voltage between first and second voltage supply terminals, the improvement comprising:
 a capacitor connected between first and second nodes;
 a first resistor connected between the first voltage supply terminal and the first node;
 means for connecting the second node to the second voltage supply terminal such that the capacitor is continuously charged by the supply voltage;

an electrically actuated switch controlled by the switching signal, said switch defining first and second switch terminals;

said plurality of light sources being connected in series between the first node and the first switching terminal;

and a second resistor connected between the second switching terminal and the second node;

said first resistor and said capacitor defining an RC time constant substantially greater than the duration of the switching signal;

said improvement effective to reduce the peak current supplied by the means for generating the supply voltage to a value substantially less than the peak current through the light sources.

10. The invention of claim 9 wherein the switch comprises a transistor.

11. The invention of claim 9 wherein the first resistor and the capacitor define a time constant no less than about 400 times the duration of the switching signal.

12. The invention of claim 9 wherein the first resistor and the capacitor define a time constant no less than about 0.04 second.

13. The invention of claim 9 wherein each of the light sources comprises a respective light emitting diode.

* * * * *